(12) United States Patent
Gigliotti, Jr. et al.

(10) Patent No.: US 8,906,170 B2
(45) Date of Patent: Dec. 9, 2014

(54) ALLOY CASTINGS HAVING PROTECTIVE LAYERS AND METHODS OF MAKING THE SAME

(75) Inventors: Michael Frances Xavier Gigliotti, Jr., Scotia, NY (US); Stephen Francis Rutkowski, Duanesburg, NY (US); Shyh-Chin Huang, Latham, NY (US); Roger John Petterson, Dr Fultonville, NY (US); Luana Emiliana Iorio, Clifton Park, NY (US); Andrew John Elliott, Greer, SC (US)

(73) Assignee: General Electric Company, Niskayuna, NY (US)

( * ) Notice: Subject to any disclaimer, the term of this patent is extended or adjusted under 35 U.S.C. 154(b) by 1166 days.

(21) Appl. No.: 12/145,459

(22) Filed: Jun. 24, 2008

(65) Prior Publication Data

US 2009/0314390 A1   Dec. 24, 2009

(51) Int. Cl.
C23C 22/56 (2006.01)
C23C 8/10 (2006.01)

(52) U.S. Cl.
USPC ........... 148/285; 148/277; 148/284; 148/286; 148/287; 164/16; 164/53; 164/55.1

(58) Field of Classification Search
USPC ........... 148/277, 284, 285, 286, 287; 164/16, 164/53, 55.1
See application file for complete search history.

(56) References Cited

U.S. PATENT DOCUMENTS

| | | | |
|---|---|---|---|
| 3,955,616 A | 5/1976 | Gigliotti, Jr. et al. | |
| 3,972,367 A | 8/1976 | Gigliotti, Jr. et al. | |
| 4,031,945 A | 6/1977 | Gigliotti, Jr. et al. | |
| 4,175,609 A | 11/1979 | Gammal et al. | |
| 4,316,498 A * | 2/1982 | Horton | 164/519 |
| 5,335,717 A | 8/1994 | Chin et al. | |
| 5,660,885 A | 8/1997 | Hasz et al. | |
| 7,347,905 B1 * | 3/2008 | Donahue et al. | 148/415 |
| 2004/0013802 A1 | 1/2004 | Ackerman et al. | |
| 2005/0000677 A1 * | 1/2005 | Kolek et al. | 164/475 |
| 2007/0022784 A1 | 2/2007 | Inoue et al. | |
| 2008/0026242 A1 | 1/2008 | Quadakkers et al. | |
| 2008/0163786 A1 | 7/2008 | Feng et al. | |
| 2009/0178775 A1 | 7/2009 | Bewlay et al. | |

FOREIGN PATENT DOCUMENTS

| | | |
|---|---|---|
| JP | 5321042 A | 2/1978 |
| JP | 0747444 A | 2/1995 |
| JP | 2000247658 A | 9/2000 |
| JP | 2005320226 A | 11/2005 |
| JP | 2006312193 A | 11/2006 |
| JP | 2007119802 A | 5/2007 |

OTHER PUBLICATIONS

Ji-Cheng Zhao, Michael Francis Xavier Gigliotti, Jr., Shyh-Chin Huang, Roger John Petterson; "Liquid metal cooled directional solidification process"; Application No. 425307 filed on Oct. 25, 1999; US Patent Issued on Aug. 21, 2001; 1-5 Pages.

EP 09162915.4 extended European search report, Feb. 16, 2010.

(Continued)

*Primary Examiner* — Lois Zheng

(74) *Attorney, Agent, or Firm* — Fletcher Yoder, P.C.

(57) ABSTRACT

An alloy casting having a protective layer disposed on a surface of the casting is provided. The protective layer is resistant to liquid metal attack, and wherein the protective layer includes an oxide of an element present in the alloy. A method of forming a protective layer on a surface of the alloy casting is also provided. The method includes disposing the alloy in a mold, and oxidizing an element of the alloy to form a protective layer on the surface of the casting.

17 Claims, 3 Drawing Sheets

(56) References Cited

OTHER PUBLICATIONS

P.R. Beeley, R. F. Smart, Investment Casting, 1995, The Institute of Metals, London, XP002558778, pp. 66-68, pp. 89-91, pp. 105-107, pp. 329-331.

Russian Office Action issued Dec. 27, 2013.

B.V. Nekrasov, Course of General Chemistry, Moscow-Leningrad, GHI, 1953, p. 412.

* cited by examiner

ALLOY CASTINGS HAVING PROTECTIVE LAYERS AND METHODS OF MAKING THE SAME

BACKGROUND

The invention relates generally to the field of alloy castings, and more particularly to liquid cooled alloy castings and methods of making the same.

Generally, superalloy castings are formed by pouring a molten metal in a mold at a high temperature greater than about 700° C. in a mold. The mold is typically placed in a liquid metal bath to cool the mold and facilitate the solidification of the melt. It is desirable to have such metals in the liquid metal bath that have relatively low density, low melting point (less than 700° C.) and low cost. Metals that are typically employed in the metal bath include lithium (186° C.), sodium (98° C.), magnesium (650° C.), aluminum (660° C.), potassium (63° C.), zinc (419° C.), indium (156° C.), tin (232° C.), antimony (630° C.), cesium (28° C.), tellurium (450° C.), and the like. Metals such as lithium, sodium, potassium and cesium have low melting temperatures, but they are very flammable, thereby causing safety concerns. On the other hand, metals such as zinc and antimony have low vapor pressures due to which these metals evaporate and pose a risk of contaminating the casting alloy. Some of the other metals, such as mercury, are toxic in nature. Aluminum and tin are generally preferred metals for liquid metal bath. Aluminum has a higher melting point than tin. As will be appreciated, heat transfer between a casting and coolant (liquid metal bath) is a function of temperature differences; therefore, liquid tin due to its lower melting point is typically preferred over liquid aluminum in removing heat from the castings.

Due to the very high temperatures involved in the casting process, the molds are prone to cracks. For example, a mismatch between the coefficients of thermal expansion of the mold and the superalloy inside the mold may result in cracks in the mold. Once the cracks have developed, the liquid tin may seep into the mold and contaminate the casting. The liquid tin attacks the surface of the casting causing pits on the surface of the casting. As will be appreciated, a pit is a defect extending from the surface towards the core of the casting. Pitting is caused due to reaction of tin with components of the superalloy that forms tin compounds.

A plausible solution to avoid pitting in such castings is to make a mold that does not crack, thus preventing liquid metal from contacting the casting surface. However, it has not been possible to make such a mold. Additionally, such a strong mold may crack the casting due to thermal expansion mismatch between the casting and the mold.

Accordingly, there is a need to provide a liquid metal attack resistant layer for castings to improve the surface finish of the castings by reducing or eliminating pitting in the castings.

BRIEF DESCRIPTION

In accordance with one aspect of the present technique, an alloy casting having a protective layer disposed on a surface of the casting is provided. The protective layer is resistant to liquid metal attack, and wherein the protective layer includes an oxide of an element present in the alloy.

In accordance with another aspect of the present technique, a casting of a nickel-based alloy having a continuous native oxide layer disposed on a surface of the casting is provided. The native oxide layer is resistant to liquid metal attack.

In accordance with yet another aspect of the present technique, a method of forming a protective layer on a surface of a casting of an alloy is provided. The method includes disposing the alloy in a mold, and oxidizing an element of the alloy to form a protective layer on the surface of the casting.

In accordance with another aspect of the present technique, a method of forming an aluminum oxide layer on a casting is provided. The method includes providing a mold having an inner coating disposed on an inner surface of the mold, and disposing an alloy in the mold, wherein at least a portion of the aluminum in the alloy reduces a portion of constituents in the inner coating to form aluminum oxide.

In accordance with yet another aspect of the present technique, a method of forming an aluminum oxide layer on a casting is provided. The method includes providing a mold, disposing an alloy in the mold to form the casting, and providing an oxidizing atmosphere in the mold to oxidize at least a portion of aluminum present in the alloy.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
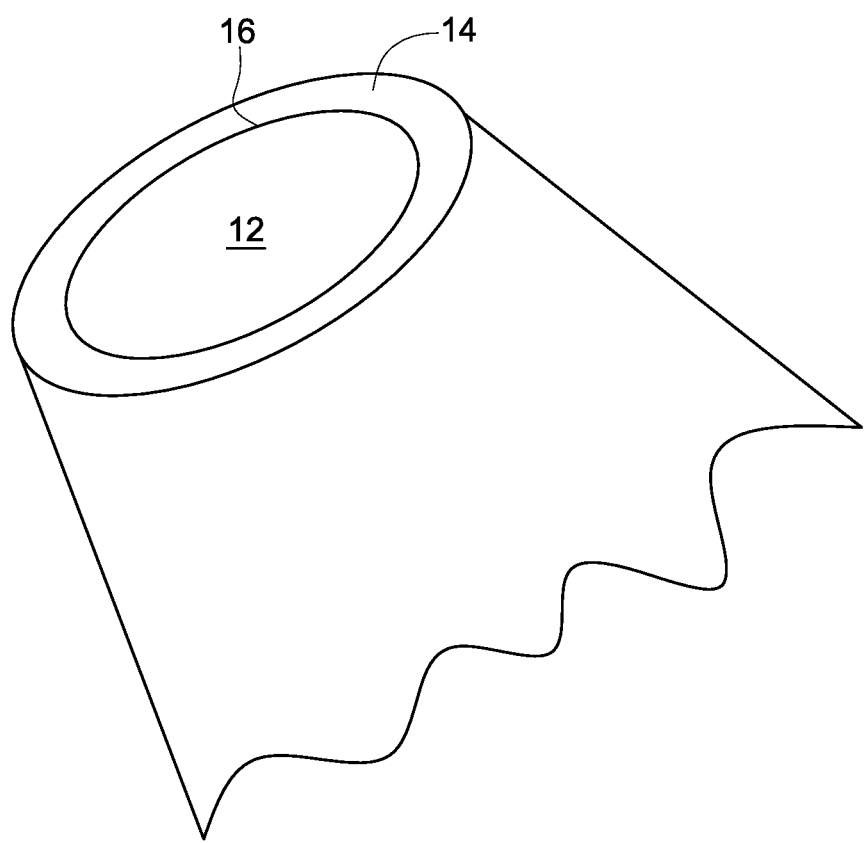
FIG. 1 is a perspective view of an alloy casting having a protective layer according to certain embodiments of the present technique.

Described herein are alloy castings having a protective layer that is resistant to liquid metal attack and methods of making the same. FIG. 1 is a perspective view of an alloy casting 12 comprising the alloy material and a protective layer 14. As used herein, the term "alloy" includes superalloys, that is the alloys that can withstand high temperatures and high stresses (tensile, thermal, vibratory and shock). In certain embodiments, the alloy may include nickel, cobalt, iron, titanium, or combinations thereof. The alloy may also include relatively lower amounts of one or more of molybdenum, tungsten, niobium, or other refractory metals. In certain embodiments, the alloy includes aluminum.

In certain embodiments, the present technique facilitates improving the surface finish of the cast alloy parts. Conventional castings of alloy parts made in a liquid-metal cooled casting process contain pits due to reaction between the alloy and the liquid tin coolant. The present technique eliminates or at least reduces the reaction between the surface 16 of the alloy casting 12 and liquid metal coolant by providing a substantially impermeable protective layer 14 on the surface 16 of the alloy casting 12. In certain embodiments, the protective layer 14 includes an oxide of an element present in the alloy. In one example, the protective layer 14 may include aluminum oxide. In one embodiment, a nickel-based alloy comprises a continuous native oxide layer, such as an aluminum oxide layer, disposed on a surface of the casting 12. In this embodiment, the native oxide layer is resistant to liquid metal attack. The protective layer 14 may be created either by reaction of the alloy with an inner coating (facecoat) on the inner surface of the mold selected to be reactive with aluminum in the alloy or by making the casting in an atmosphere that is oxidizing to aluminum of the alloy, but relatively less reactive to nickel, cobalt, or refractory metals of the alloy.

In certain embodiments, the protective layer 14 may include an oxide layer that is resistant to liquid metal attack. In this embodiment, the protective layer 14 prevents the liquid metal from contaminating or reacting with the metals of the alloy. The protective layer 14 may include native oxides, that is, the oxides of one or more elements present in the alloy. In certain embodiments, aluminum oxide constitutes a majority of the oxide layer 14. Other oxides, such as chromium oxide, may also be formed where chromium is present as one of the elements in the alloy.

Typically, the protective layer 14 is formed on the bottom side (side that is closer to the bottom of the mold) and on the sidewalls that are adjacent to the mold side walls. The protective layer 14 is substantially continuous throughout the surface 16 of the casting 12. As used herein, the term substantially continuous embodies instances where a small portion of a surface 16 of the casting 12 may not have the protective layer 14 disposed thereon. The small portion may be in a range of a few microns. Such a discontinuity may be caused due to several factors which may not be controlled during the casting process. For example, the discontinuity may be caused due to poor availability of oxygen or the metal (that is to be oxidized) to form the oxide. The thickness of the oxide layer may or may not be uniform throughout the surface of the alloy casting. The thickness of the protective layer on the casting may be in a range from about 0.5 microns to about 50 microns. In one embodiment, at least a portion of the protective layer is formed simultaneously with a casting of the melt. In one embodiment, the alloy casting includes a nickel-based alloy having a continuous native oxide layer disposed on the surface of the casting.

In certain embodiments, the alloy castings of the present technique may be employed in airfoils for gas turbine applications, structural components, casings, rings, exhausts and combustion components for gas turbine applications, aero structures and components for airframe applications, turbocharger impellers and wheels for the automotive industry, and other 'high stress' components.

Figure 2:
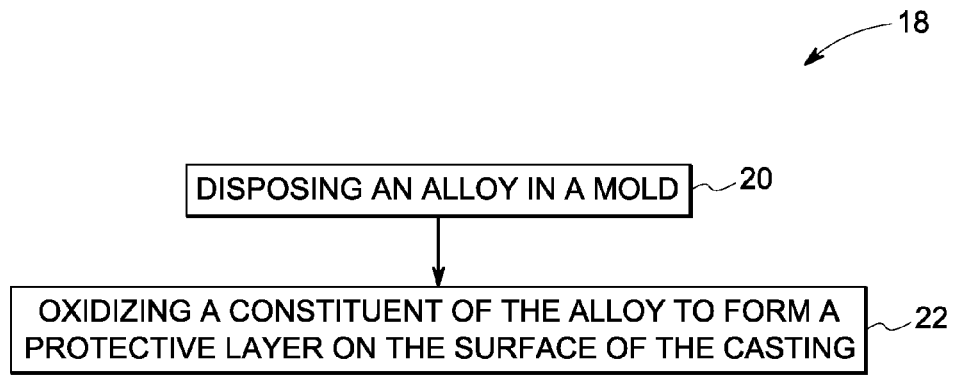
FIG. 2 is a flow chart illustrating a method of forming a casting having a protective layer according to certain embodiments of the present technique.

In certain embodiments, a method of forming a protective layer on a surface of an alloy casting is provided. FIG. 2 illustrates a flow chart 18 representing an exemplary method of making an alloy casting having a protective layer. At block 20, the alloy is poured in the mold. At block 22, an element of the alloy is oxidized to form the protective layer on the surface of the casting. An exemplary arrangement for carrying out the method described with respect to FIG. 2 is illustrated in FIG. 3.

Figure 3:
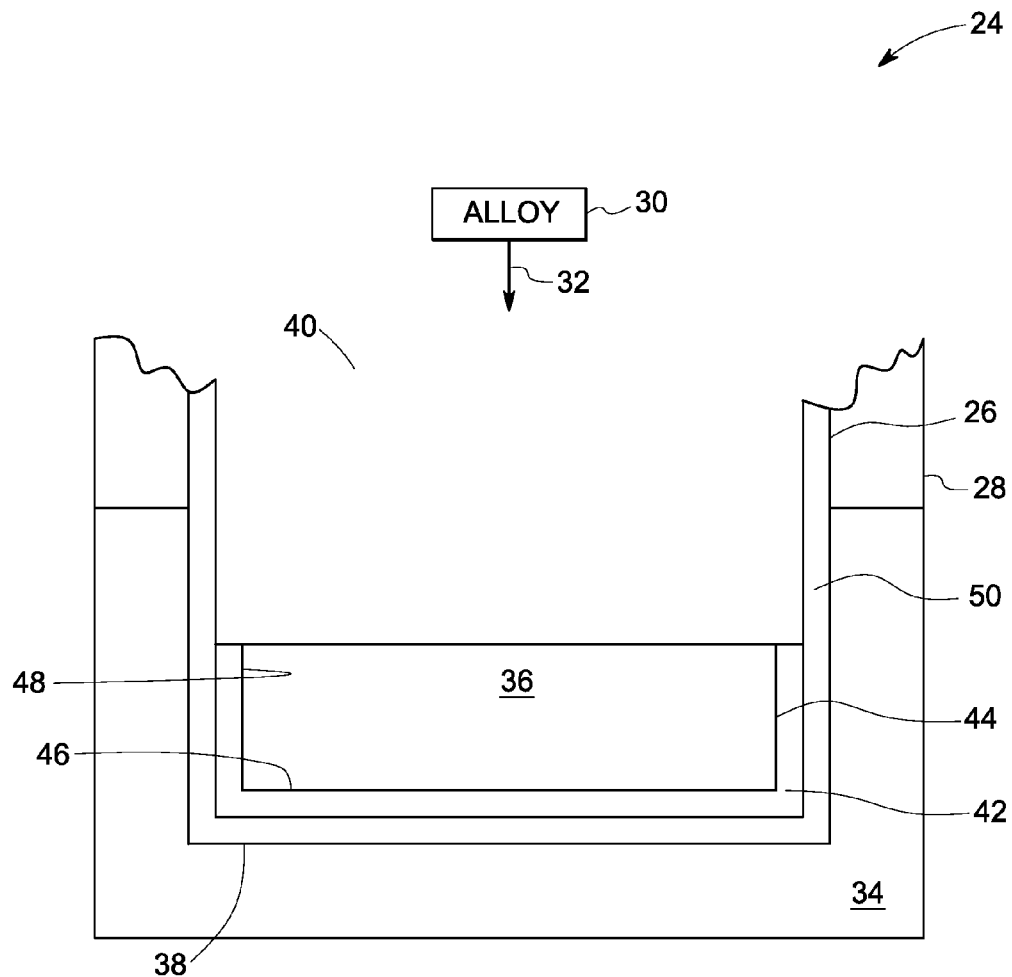
FIG. 3 is a cross-sectional side view of an arrangement for forming alloy castings having protective layers according to the exemplary method described with reference to FIG. 2.

As illustrated in FIG. 3, the arrangement 24 includes a mold 26 placed in a liquid metal bath 28. The arrangement 24 is typically placed in a container having controlled atmosphere. For example, the container may include a furnace. The mold 26 is adapted to receive the alloy 30 that is poured in the mold as illustrated by the arrow 32.

The mold 26 may be a ceramic mold. For example, the mold 26 is made of zirconia, zircon, silica, alumina, or combinations thereof. The mold 26 is configured to withstand high temperature of the alloy 30 to a reasonable extent. That is, other than developing one or more minor cracks (not shown), the ceramic mold 26 more or less remains integrated upon receiving the alloy 30. The solidification of the alloy 30 to form the casting 36 progresses from the bottom 38 to the top 40 within the mold 26. In instances where the mold develops cracks, the cracks may allow the liquid metal 34 to seep in through the cracks and contaminate the alloy casting. To prevent the contamination of the casting 36 due to ingress of the liquid metal 34, in certain embodiments of the present technique, deposition or formation of a protective layer 42 on the surface 44 of the casting 36 is enabled. The protective layer 42 begins by initially depositing at the bottom side 46 of the casting and gradually progresses along the side walls 48 of the casting 36. As will be discussed in detail with regard to FIG. 4, in some embodiments, the mold 26 includes a coating 50 on the inner surface of the mold 26. In these embodiments, one or more elements of the alloy 30 may reduce one or more constituents of the inner coating 50 of the mold 26 to form the protective layer 42 on the surfaces 46 and 48 of the casting 36. Alternatively, as will be described in detail with regard to FIG. 5, the protective layer 42 may be formed by providing oxidizing environment to the casting 36 immediately before, during or after the solidification of the casting 36. The casting 36 thus formed includes protective layer 42 that is primarily coupled to the casting 36. Although, in some instances a portion of the protective layer 42 may be coupled to the mold 26. As the temperature of the casting 36 comes down, the casting 36 may shrink and move away from the mold walls along with at least a portion of the protective layer 42. In one embodiment, at least a portion of the protective layer 42 is not coupled to a surface of the mold 26.

Figure 4:
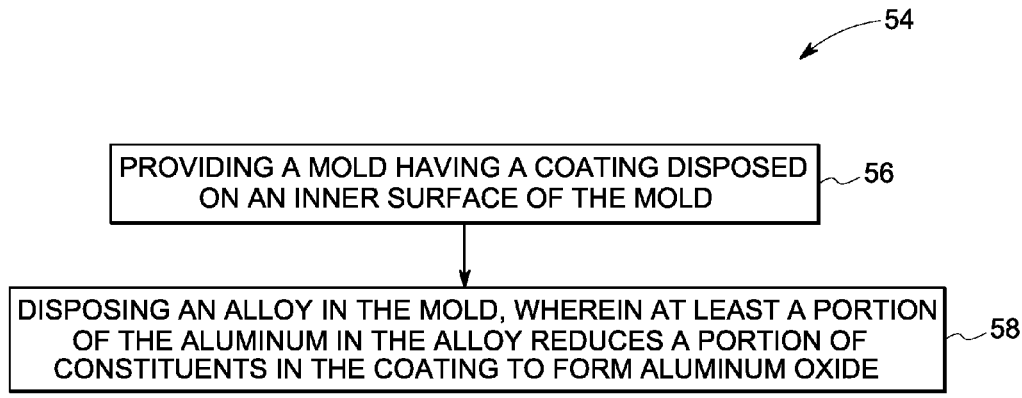
FIGS. 4-5 are flow charts illustrating alternate methods of forming protective layers on alloy castings according to certain embodiments of the present technique.

FIG. 4 illustrates a flow chart 54 for depositing a protective layer on a casting. At block 56, a mold having a coating disposed on an inner surface of the mold is provided. The inner coating may be reactive to at least one element of the alloy. Additionally, the inner coating may be inert or non-reactive to the other elements of the alloy. In certain embodiments, the inner coating may include chromia, niobia, titania, tantala, silica, zircon, yttria, or combinations thereof. At block 58, the alloy is disposed in the mold. In one example, a portion of the aluminum present in the alloy reduces at least a portion of constituents, such as silicon oxide (silica), present in the inner coating to form an aluminum oxide layer on the surface of the casting. In addition to aluminum oxide, other oxides such as chromia may also be present in the oxide layer.

Figure 5:
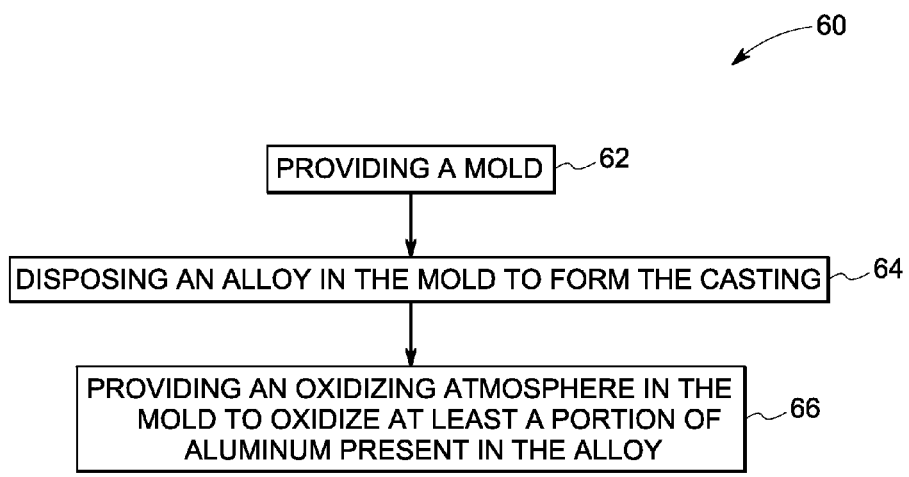

FIG. 5 illustrates a flow chart 60 representing an exemplary method of forming a protective layer on the casting. At block 62, a mold is provided, as discussed earlier, the mold may be a ceramic mold. At block 64, the alloy is disposed in the mold to form the casting. At block 66, an oxidizing atmosphere is introduced in the mold to oxidize at least a portion of aluminum present in the alloy. The oxidizing atmosphere may be introduced immediately before, during or after the alloy solidifies. In one embodiment, the oxidizing atmosphere comprises an oxygen source diluted by an inert carrier. Non-limiting examples of the oxygen source may include, oxygen, carbon monoxide, carbon dioxide, moisture, or combinations thereof. In one example, the inert carrier may include argon. In one embodiment, the oxidizing atmosphere constitutes about 2 percent to about 20 percent of the total amount of a mixture of the oxygen source and the inert carrier. In one example, the oxidizing atmosphere contains about 10 percent carbon monoxide and about 90 percent argon and.

EXPERIMENTS

The ceramic molds employed in the examples below were manufactured in the laboratory facility using a mold building procedure commonly practiced in the investment casting industry. The ingredients, such as alumina, zirconia, zircon, and silica used to build the molds were obtained from a number of ceramic powder suppliers, such as Brenntag Specialties Inc. (1000 Coolidge Street, South Plainfield, N.J. 07080) and Norton Materials (1 New Bond Street, Worcester, Mass. 01615-0137). Argon, CO and $CO_2$ gases were obtained from Airgas East (325 McCansland Court, Cheshire, Conn. 06410). The directional solidification furnace was obtained from ALD Vacuum Technology (Wilhelm-Rohn-Strausse 35, 63450 Hanau, Germany).

Comparative Example 1

A ceramic mold with alumina-based inner surfaces (facecoat) was used. The inner surfaces of the mold were prepared from a slurry, which was formed by mixing alumina powder in colloidal silica. Dipping a fugitive pattern (for example wax) into the slurry and then sieving dry alumina grains onto the freshly dipped pattern formed the mold inner surfaces. The steps of the slurry dipping and then alumina sieving were repeated two times. After those two inner surface layers, the steps of the slurry dipping and then alumina sieving were repeated ten more times, but larger alumina grains were used in these backup layers. Each coat of slurry and grains were air-dried before subsequent coats were applied. The fugitive pattern was removed from the mold using a steam autoclave. Subsequently, the mold was fired to a temperature of about 1000° C. for a period of time effective to stabilize the mold. The alumina-based mold was then placed in a directional solidification furnace, specially equipped with a pot of liquid tin for additional cooling during casting. In the directional solidification furnace, the mold was first pre-heated in a heater to a temperature in a range from about 1500° C. to about 1550° C. in a vacuum.

Separately, a charge of nickel-based superalloy was melted in a crucible and the molten alloy was disposed into the pre-heated mold in the vacuum environment. The superalloy included 7.5 weight percent Co, 9.75 weight percent Cr, 4.2 weight percent Al, 7.5 weight percent Ti, 0.5 weight percent Nb, 4.8 weight percent Ta, 1.5 weight percent Mo, 6 weight percent W, 0.15 weight percent Hf, 0.08 weight percent C, 0.009 weight percent B, with the balance being Ni. The mold filled with the molten superalloy was then withdrawn from the heater and immersed into the pot of molten tin, also in the vacuum environment. At the completion of the withdrawal, the liquid-tin-cooled mold was retrieved from the tin pot and it showed signs of mold cracking and tin ingress inside of the mold. The mold was then mechanically knocked loose to expose the solidified superalloy casting. The casting was found incased with tin, which managed to ingress inside the mold during the liquid-tin-enhanced solidification process. The tin material around the superalloy casting was then removed by mechanical means as well as by chemical cleaning. After the chemical cleaning of the tin material, the surfaces of the superalloy casting were inspected visually or under a low magnification microscope to determine the extent of tin reaction with the metal surfaces in the form surface pits.

In this example, where a mold with alumina-based inner surfaces was used in the casting in a vacuum environment, a high degree of tin pits was found on the surfaces of the superalloy casting. The high degree of surface pits was deemed undesirable.

Comparative Example 2

In this example, a ceramic mold with alumina-based inner surfaces similar to Example 1 was used in the liquid-tin-cooled directional solidification experiment. In this second example, however, the steps of mold pre-heat, superalloy melting, mold withdrawal and tin immersion were carried in a flowing gas mixture including argon with 10 percent CO, rather than in a vacuum as used in Example 1. The flow rate of the argon plus 10 percent CO mixture was set at 5 cubic feet per hour.

The resultant casting using the argon plus 10% CO gas mixture was also found to show a high degree of tin pitting on the surfaces of the superalloy casting. This second example thus showed that the use of the argon plus 10 percent CO gas atmosphere did not improve the surface quality of the superalloy casting when a ceramic mold with alumina-based inner surfaces was used in a liquid-tin-cooled directional solidification process.

Example 3

In this example, a ceramic mold with zirconium silicate (zircon) based inner surfaces (facecoat) was used. The inner surfaces of the mold used in this example were prepared from slurry, which was formed by mixing zircon powder in colloidal silica. Dipping a fugitive pattern into the slurry and then sieving dry alumina grains onto the freshly dipped pattern formed the mold inner surfaces. The steps of the slurry dipping and then alumina sieving were repeated two times. After formation of the two inner surface layers, the steps described in Example 1 were used to build up additional ten backup layers. The mold was then fired to a temperature of about 1000° C. for a period of time effective to stabilize the mold.

The ceramic mold used in this example was thus different from the ones used in Examples 1 and 2 only in the makeup of the inner surfaces. The inner surfaces of this mold included zircon plus colloidal silica mixture, whereas those of the molds used in examples 1 and 2 included an alumina plus colloidal silica mixture.

This mold with zircon-based inner surfaces was used in a directional solidification experiment using procedures described in Example 1. The resultant superalloy casting was found to show an intermediate degree of tin pits on the surfaces of the casting. This example thus showed that the use of a zircon-based mold moderately improved the surface quality of the superalloy casting when the liquid-tin-cooled directional solidification process was carried out in a vacuum.

An examination of the surfaces of the superalloy casting produced in this example showed the formation of a somewhat continuous layer of oxides on the surfaces of the superalloy casting. The oxide layer formed on the surfaces of the cast superalloy was found to be predominantly alumina, particular in regions next to the superalloy material. The alumina-based oxide formed on the surface of the superalloy casting was concluded to be responsible for the reduced level of tin pits observed the surfaces of the superalloy casting.

Example 4

In this example, a ceramic mold with zircon-based inner surfaces similar to Example 3 was used in the liquid-tin-cooled directional solidification experiment. Also, the steps of mold pre-heat, superalloy melting, mold withdrawal and tin immersion were carried in a flowing gas mixture including argon with 10 percent CO, rather than in a vacuum. The flow rate of the argon plus 10 percent CO mixture was set at 5 cubic feet per hour.

The resultant casting using the argon plus 10 percent CO gas mixture was found to show a low degree of tin pitting on the surfaces of the casting. This example thus showed that the use of the argon plus 10 percent CO gas atmosphere further improved the surface quality of the superalloy casting when a ceramic mold with zircon-based inner surfaces was used in a liquid-tin-cooled directional solidification process.

An examination of the surfaces of the superalloy casting produced in this example showed the formation of a more continuous layer of oxides on the surfaces of the superalloy casting. The oxide layer formed on the surfaces of the cast superalloy was also found to be predominantly alumina, similar to Example 3. However, the aluminum oxide layer formed on the surface of the cast superalloy was found to be more continuous in this sample, in comparison to the surface oxide found in the previous example. The more continuous alumina surface oxide was concluded to be responsible for the lower level of tin pits observed in this example. The continuous alumina layer served as a baffle that prevented direct contact of tin ingress with the cast superalloy surfaces, thus prevented, or at least reduced the rate of tin-metal reaction that was responsible for the formation of metal surface pitting defects.

Example 5

In this example, a ceramic mold with zircon-based inner surfaces similar to Examples 3 and 4 was used in the liquid-tin-cooled directional solidification experiment. In this example, however, the steps of mold pre-heat, superalloy melting, mold withdrawal and tin immersion were carried in a flowing gas mixture including argon with 5 percent $CO_2$, rather than in a vacuum or in a flowing mixture of argon plus 10 percent CO, as described in previous examples. The flow rate of the argon plus 5 percent $CO_2$ mixture was set at 5 cubic feet per hour.

The resultant casting was found to show a low degree of tin pitting on the surfaces of the casting. This example thus showed that the use of the argon plus 5% $CO_2$ gas atmosphere also greatly improved the surface quality of the superalloy casting when a ceramic mold with zircon-based inner surfaces was used in a liquid-tin-cooled directional solidification process. The beneficial effect of the flowing mixture of argon plus 5 percent $CO_2$ observed here was thus similar to that of the flowing mixture of argon plus 10 percent CO, as observed in example 4.

Example 6

In this example, a ceramic mold with zircon-based inner surfaces similar to Examples 3 to 5 was used in the liquid-tin-cooled directional solidification experiment. In this example, however, the steps of mold pre-heat, superalloy melting, mold withdrawal and tin immersion were carried out in a flowing gas of $CO_2$, rather than in a vacuum, in a flowing mixture of argon plus 10 percent CO, as described in example 4, or in a flowing argon plus 5 percent $CO_2$ mixture, as described in Example 5.

The resultant casting using the $CO_2$ gas was found to show a high degree of tin pitting on the surfaces of the casting. This example thus showed that the use of the $CO_2$ gas atmosphere, without the argon gas as a carrier as in the case of Example 5, was not effective to improve the surface quality of the superalloy casting, even when a ceramic mold with zircon-based inner surfaces was used for casting in a liquid-tin-cooled directional solidification process.

Example 7

In this example, a ceramic mold with alumina-based inner surfaces similar to examples 1 and 2 was used, but an additional procedure was used to treat the inner surfaces of the mold before use for casting. More specifically, the mold used in this Example was first prepared to create the alumina-base inner surfaces using the mold building and firing procedure described in Example 1. Before the actual use of the mold for casting, however, the mold inner surfaces were further treated with an additional procedure known in the foundry industry as "wash". As used herein, the term "wash" refers to a procedure to rinse the interior surfaces of the mold with a water-based solution suspended with ceramic particles of various choices. In the present example, the mold with the alumina-based inner surfaces was washed with a solution containing about 10 volume percent of yttria particles. Subsequently, the yttria-washed mold was fired at 1000° C. before use for casting in a liquid-tin-cooled directional solidification furnace. As in Example 1, this Example of casting was carried out in a vacuum atmosphere.

In this example, where a mold with yttria-washed alumina-based inner surfaces was used in casting in a liquid-tin-cooled directional solidification surface in a vacuum atmosphere, the resultant casting was found to have an intermediate degree of tin pitting. In comparison to the result of Example 1, the present Example thus showed an improvement in the surface quality of the superalloy casting due to the use of an yttria-washed mold with alumina-based inner surfaces.

Example 8

In this Example, a ceramic mold with yttria-washed alumina-based inner surfaces similar to that of Example 7 was also used in the liquid-tin-cooled directional solidification experiment. In the present example, however, the steps of mold pre-heat, superalloy melting, mold withdrawal and tin immersion were carried in a flowing gas mixture consisting of argon with 10% CO, rather than in a vacuum as used in Example 7. The flow rate of the argon plus 10% CO mixture was set at 5 cubic feet per hour.

The resultant casting using the argon plus 10% CO gas mixture was found to show a low degree of tin pitting on the surfaces of the superalloy casting. The present example thus showed that the use of the argon plus 10% CO gas atmosphere further improved the surface quality of the superalloy casting when a ceramic mold with yttria-washed alumina-based inner surfaces was used in a liquid-tin-cooled directional solidification process.

The following table summarizes the results of Examples 1-8 described in detail above.

TABLE 1

| Example No. | Facecoat Material | Wash Material | Furnace Atmosphere | Degree of Tin Reaction |
|---|---|---|---|---|
| 1 | Alumina | — | Vacuum | High |
| 2 | Alumina | — | Ar + 10% CO | High |
| 3 | Zircon | — | Vacuum | Intermediate |
| 4 | Zircon | — | Ar + 10% CO | Low |
| 5 | Zircon | — | Ar + 5% $CO_2$ | Intermediate |
| 6 | Zircon | — | $CO_2$ | High |
| 7 | Alumina | Yttria | Vacuum | Intermediate |
| 8 | Alumina | Yttria | Ar + 10% CO | Low |

As can be seen in the Table 1, the results of Examples 1 and 2 indicate that ceramic mold with alumina-based inner surfaces are not a desirable type of mold to use in a liquid-tin-cooled directional solidification process. The castings obtained by using ceramic molds with alumina-based inner surfaces are prone to a high degree of surface pitting defects, which are deemed to be unacceptable in production. The ceramic molds with alumina-based inner surfaces cannot protect the alloy casting from reaction with tin ingress. The high degree of surface pits produced using mold with alumina-based inner surfaces cannot be improved by either casting in a vacuum or in a flowing mixture of argon and 10% CO gases.

To the contrary, the results of Examples 3 and 4 indicate that ceramic molds with zircon-based inner surfaces are more desirable to use in a liquid-tin-cooled directional solidification process. The mold with zircon-based inner surfaces is capable of producing a superalloy casting with a moderate degree of tin pits, when the casting process is carried out in a vacuum. The mold with zircon-based inner surfaces is capable of producing a superalloy casting with a low degree of tin pits, when the casting process is carried out in a flowing mixture of argon plus 10 percent CO gases. The flowing mixture of argon and 10 percent CO gases thus creates an environment, which further improves the quality of the cast surface by reducing the tendency to form casting surface pits.

The results of Examples 5 and 6 provide further teaching about the effect of furnace environment during casting. The mixture of argon plus 5 percent $CO_2$ has a beneficial effect similar to that of the mixture of argon plus 10 percent CO.

The results of Examples 7 and 8 provide further information about the effect of mold inner surface chemistry. Although molds with alumina-based inner surfaces are not desirable, as shown in Examples 1 and 2, the treatment with yttria wash can significantly reduce the degree of tin reaction on the cast surfaces of the casts prepared in such molds with alumina-based inner surface. The improvement is particularly pronounced, when the yttria-washed, alumina-based mold was used in the liquid-tin-cooled directional solidification process in combination with an argon and CO atmosphere. Accordingly, the yttria wash provides an alternative method to modify the mold inner surfaces without a complete change in the ceramic system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming a protective layer on a surface of a casting of an alloy, comprising:
   disposing the alloy in a mold; and
   oxidizing an element of the alloy, while the alloy is in the mold, to form a protective layer on the surface of the casting, such that the protective layer is attached to the surface of the casting;
   wherein a thickness of the protective layer is in a range from about 1.2 microns to about 50 microns.

2. The method of claim 1, wherein the mold comprises an inner coating that is reactive to at least one element of the alloy and relatively less reactive or inert to other elements of the alloy.

3. The method of claim 2, wherein the inner coating of the mold comprises chromia, niobia, titania, tantala, silica, zircon, yttria, or combinations thereof.

4. The method of claim 2, wherein oxidizing comprises:
   reacting at least one material from the inner coating of the mold with aluminum present in the alloy.

5. The method of claim 1, wherein oxidizing comprises:
   exposing the alloy or the casting to an oxidizing atmosphere to facilitate oxidation of aluminum metal present in the alloy.

6. The method of claim 5, wherein the oxidizing atmosphere comprises an oxygen source diluted by an inert carrier.

7. The method of claim 6, wherein the oxygen source comprises carbon monoxide, oxygen, carbon dioxide, moisture, or combinations thereof.

8. The method of claim 6, wherein the inert carrier comprises argon.

9. The method of claim 6, wherein the oxidizing atmosphere comprises oxygen source in a range of about 2 percent to about 20 percent of the total amount of a mixture of the oxygen source and the inert carrier.

10. The method of claim 6, wherein the oxygen source comprises about 10 percent carbon monoxide and about 90 percent argon.

11. The method of claim 1, wherein the mold comprises zirconia, zircon, silica, alumina, or combinations thereof.

12. The method of claim 1, wherein at least a portion of the protective layer is formed simultaneously with a casting of the alloy.

13. The method of claim 1, wherein at least a portion of the protective layer is not coupled to a surface of the mold.

14. A method of forming an aluminum oxide layer on a casting, comprising:
   providing a mold having a coating disposed on an inner surface of the mold;
   disposing an alloy in the mold, wherein at least a portion of aluminum in the casting reduces a portion of constituents in the coating to form the aluminum oxide layer, wherein the aluminum oxide layer is attached to a surface of the casting, wherein at least a portion of the aluminum oxide layer is not coupled to a surface of the mold, and wherein a thickness of the aluminum oxide layer is in a range from about 1.2 microns to about 50 microns; and
   immersing the mold and the casting into a liquid metal coolant.

15. The method of claim 14, wherein the liquid metal coolant comprises at least one molten metal from the group consisting of lithium, sodium, magnesium, aluminum, potassium, zinc, indium, tin, antimony, cesium, and tellurium.

16. A method of forming an aluminum oxide layer on a casting, comprising:
   providing a mold;
   disposing an alloy in the mold to form the casting;
   providing an oxidizing atmosphere in the mold to oxidize at least a portion of aluminum present in the alloy, forming the aluminum oxide layer, wherein the aluminum oxide layer is attached to an outer surface of the casting, and wherein a thickness of the aluminum oxide layer is in a range from about 1.2 microns to about 50 microns; and
   immersing the mold and the casting into a liquid metal coolant.

17. The method of claim 16, wherein the liquid metal coolant comprises at least on molten metal from the group consisting of lithium, sodium, magnesium, aluminum, potassium, zinc, indium, tin, antimony, cesium, and tellurium.

* * * * *